(12) United States Patent
Kim

(10) Patent No.: US 8,793,859 B2
(45) Date of Patent: Aug. 5, 2014

(54) METHOD FOR MANUFACTURING A FLEXIBLE PIPING DEVICE FOR AN EXHAUST GAS SYSTEM OF A MOTOR VEHICLE

(75) Inventor: Dae Hyun Kim, Kyunggi-Do (KR)

(73) Assignee: SJM Co. Ltd. (KR)

( * ) Notice: Subject to any disclaimer, the term of this patent is extended or adjusted under 35 U.S.C. 154(b) by 213 days.

(21) Appl. No.: 13/281,576

(22) Filed: Oct. 26, 2011

(65) Prior Publication Data
US 2012/0103051 A1 May 3, 2012

(30) Foreign Application Priority Data
Oct. 29, 2010 (EP) ................................. 10014154

(51) Int. Cl.
*B23P 25/00* (2006.01)
*F16L 11/16* (2006.01)
*B21C 37/12* (2006.01)

(52) U.S. Cl.
CPC ............... *B21C 37/121* (2013.01); *F16L 11/16* (2013.01); *B21C 37/123* (2013.01); *B21C 37/127* (2013.01)
USPC ............... 29/458; 72/49; 72/342.1; 138/129; 138/154

(58) Field of Classification Search
USPC ........ 29/458; 72/49, 50, 367.1, 368; 138/129, 138/154
See application file for complete search history.

(56) References Cited

U.S. PATENT DOCUMENTS

| | | | |
|---|---|---|---|
| 925,317 A * | 6/1909 | Eldred | 138/136 |
| 2,237,309 A * | 4/1941 | McMinn | 219/85.14 |
| 2,380,107 A * | 7/1945 | Hobrock | 138/171 |
| 2,964,796 A * | 12/1960 | Press | 264/313 |
| 3,804,390 A * | 4/1974 | Jennings et al. | 266/117 |
| 4,783,980 A * | 11/1988 | Varga | 72/49 |
| 4,952,262 A * | 8/1990 | Washkewicz et al. | 156/149 |
| 4,975,128 A * | 12/1990 | Schmitz | 148/520 |
| 6,240,972 B1 * | 6/2001 | Takikawa et al. | 138/154 |
| 6,427,727 B1 * | 8/2002 | Thomas | 138/106 |
| 6,543,488 B2 * | 4/2003 | Foti et al. | 138/135 |
| 2001/0015233 A1 * | 8/2001 | Herman et al. | 138/135 |
| 2006/0278291 A1 * | 12/2006 | Baumhoff et al. | 138/135 |

FOREIGN PATENT DOCUMENTS

WO 2007006321 1/2007

OTHER PUBLICATIONS

George Addison Wardlaw, Standards and Specifications for Metals and Metal Products, U.S. Government Printing Office, 1933, Publication No. 120, p. 86.*
European Search Report dated May 4, 2011 in European Application No. 10014154.8.

* cited by examiner

*Primary Examiner* — David Bryant
*Assistant Examiner* — Ruth G Hidalgo-Hernande
(74) *Attorney, Agent, or Firm* — Plumsea Law Group, LLC

(57) ABSTRACT

The present invention relates to a method for manufacturing a flexible piping device for an exhaust gas system of a motor vehicle, said method comprising the steps:
   a) forming a wound metal hose from at least one profiled metal strip, so that strip edges of adjacent strip windings movably interlock;
   b) exposing said wound metal hose to heat; and
   c) assembling the flexible piping device from said wound metal hose and from other components.
In order to further reduce or eliminate an ageing function of the flexible piping device to allow the user of the flexible piping device to receive functionality and properties over lifetime at similar condition, the present invention provides that step b) includes subjecting the wound metal hose to quenching.

35 Claims, 5 Drawing Sheets

FIG. 5a (State of the art)

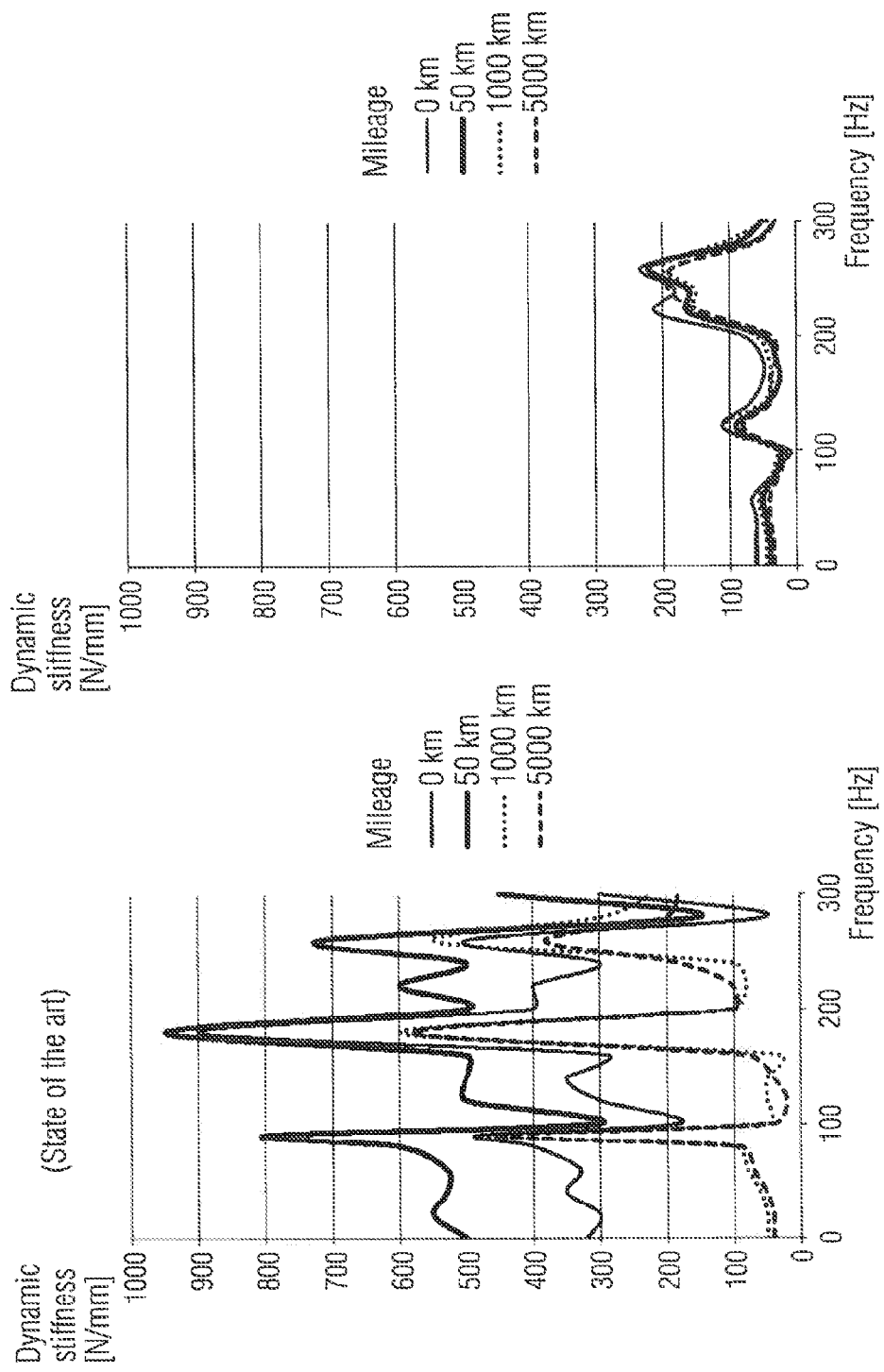

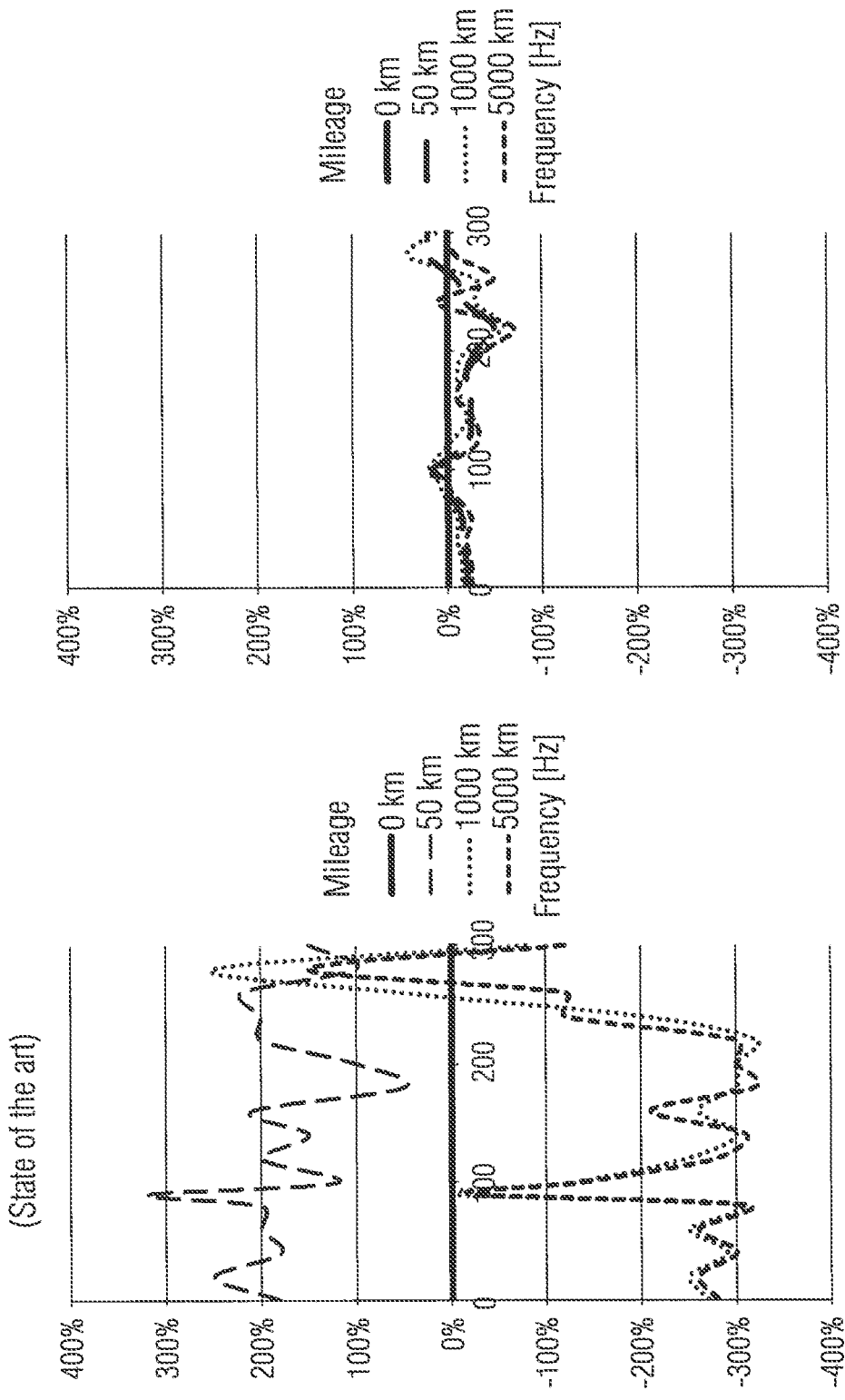

METHOD FOR MANUFACTURING A FLEXIBLE PIPING DEVICE FOR AN EXHAUST GAS SYSTEM OF A MOTOR VEHICLE

The present invention relates to a method for manufacturing a flexible piping device for an exhaust gas system of a motor vehicle, said method comprising the steps:
a) forming a wound metal hose from at least one profiled metal strip, so that strip edges of adjacent strip windings movably interlock;
b) exposing said wound metal hose to heat; and
c) assembling the flexible piping device from said wound metal hose and from other components.

Wound metal hoses of the above type and flexible piping elements comprising same, respectively, are usually arranged in exhaust pipes in order to provide a high level of tightness and less emission of noise. This is particularly relevant for motor vehicles, where the motor imparts motions, oscillations and vibrations into the exhaust system. A flexible piping device may be a decoupling element, which may comprise the wound metal hose and other components such as a bellows, a textile reinforcement, such as a braided or woven structure, or combinations thereof. Preferably, the flexible piping device is provided in the exhaust system of a combustion engine in such a way that the device causing motions, oscillations and vibrations, as, for example, the motor, is decoupled from the remainder of the exhaust system. Wound metal hoses of the above type are made from a profiled metal strip which is wound in helical shape, so that the edges of adjacent strip windings interlock. On the one hand, the interlock structure is required to provide a high level of tightness, so that it is useful that the interlocked edges contact each other with high pressure. On the other hand, the flexibility of the wound metal hose is enhanced when the interlocked edges are movable relative to each other. In conventional flexible piping devices, the so-called thermal stiffening can be encountered, wherein the friction between adjacent interlocked strip windings increases subsequent to a thermal impact, such that the flexibility of the wound metal hose is reduced.

Therefore, for the design of the wound metal hose, a subsequent change of the flexibility of the metal hose due to thermal impact has to be accounted for. According to conventional methods, the interlocked strip windings are manufactured with greater clearance than required for providing an optimized tightness.

Moreover, a flexible piping device having a wound metal hose with interlocked strip windings shows a significant ageing behaviour in respect of the dynamic properties over lifetime. This behaviour results in difficulties to predict system properties into an exhaust system, like mechanical loads, etc. The reason for this ageing behaviour is the friction of the interlocked adjacent strip windings.

A conventional manufacturing process of the above type is described in the document WO 2007/0006321 A1, which provides a flexible piping device with improved ageing behaviour. Since the wound metal hose integrated into the flexible piping device is exposed to heat at the time of manufacture, a thermal stiffening rate can be limited to 100%. The thermal stiffening rate is meant to indicate the increment of friction of the wound metal hose under operating conditions of the flexible piping device compared to its original state.

However, as the thermal stiffening rate still can reach 100%, the flexible piping device furnished with such type of wound metal hose still suffers from ageing over its lifetime, wherein the ageing results in so called NVH effects (noise, vibration, harshness).

The object of the invention is to further improve the method of the above type so as to further reduce or eliminate an ageing function of the flexible piping device to allow the user of the flexible piping device to receive functionality and properties over lifetime at similar condition.

The above-identified object is solved by the method for manufacturing a flexible piping device for an exhaust gas system of a motor vehicle according to claim 1, said method comprising the steps:
a) forming a wound metal hose from at least one profiled metal strip, so that strip edges of adjacent strip windings movably interlock;
b) exposing said wound metal hose to heat; and
c) assembling the flexible piping device from said wound metal hose and from other components;
wherein step b) includes subjecting the wound metal hose to quenching.

The wound metal hose is preferably made from austenitic steel. Exposure of the wound metal hose to heat, e.g. in terms of solution annealing or solution heat treatment, relieves residual stress resulting from plastic deformation of the metal strip when forming the wound metal hose. Now, surprisingly, it has been found that subsequent quenching can significantly enhance the effects of the heat exposure and can further reduce the above mentioned NVH effects by an artificial ageing. It is belived that the thermal shock imparted by quenching causes beads and burrs resulting from step a) to become brittle. When the wound metal hose is deformed, e.g. bent, expanded, contracted or distorted, the beads and burrs are ground between the contacting surfaces so as to crack and fall off. It is assumed that extremely rapid cooling rates occur in those minute beads and burrs, which prevent the formation of any crystal structure. As a result of that pre-conditioning treatment of the wound metal hose by heat exposure and subsequent quenching, residual stress and the coefficient of friction on the contacting surfaces of the wound metal hose are significantly reduced, which can be verified by experimental tests. Furthermore, residual stress and the coefficient of friction on the contacting surfaces remain essentially constant on a reduced level over the lifetime of the vehicle equipped with the flexible piping device. In a conventional flexible piping device for an exhaust gas system of a motor vehicle, residual stress of the would metal hose is relieved creepingly over the lifetime of the vehicle with increasing number of thermal and mechanical loads sustained. Contemporary gasoline or diesel engines operate in an exhaust gas temperature range of about 750 to 950° C. The creeping residual stress relieve causes a considerable variation of the product properties. However, the inventive method anticipates the residual stress relieve of the wound metal hose at the time of manufacture up to an extent to which the product properties remain substantially constant over the lifetime of the vehicle. As a result, the flexible piping device can be designed with much less clearance as would be required in order to compensate for subsequent change of the flexibility of the metal hose in a conventional flexible piping device. This enhances the tightness of the wound metal hose and improves the overall performance of the flexible piping device produced according to the invention.

It may prove advantageous in terms of procedural economy when forming a continuous strand of a wound metal hose in step a) and/or subjecting said continuous strand to in-line conditioning including in-line heat exposure and/or in-line quenching in step b). Therefore, in a continuous process, the steps a) and b) may be conducted with minimum time and with minimum efforts in terms of handling and logistics.

It may prove helpful when feeding said wound metal hose from step a) to step b) and/or from step b) to step c), preferably from step a) to step c). Considerably synergetic effects may arise from this measure. Firstly, the process time and required effort can be significantly reduced. Secondly, the convective temperature loss between heat exposure and quenching can be minimized, enhancing the effects of quenching.

According to a preferred embodiment of the invention, step a) comprises profiling said metal strip and/or winding said metal strip in the shape of a thread, such that strip edges of adjacent strip windings movably engage into one another. Such hoses, referred to "agraff"-type hoses, prove to be particularly useful in the field of flexible piping devices for exhaust gas systems of motor vehicles.

It may prove beneficial when said wound metal hose subjected to step b) comprises a coating, preferably a liquid coating, preferred a lubricant coating or lubricant residues remaining from step a). The coating may be provided only on the contacting or sliding surfaces of the wound metal hose or on the entire surface thereof. It has been found that such coating considerably improves the results of quenching, as the coating may react with the coated surface of the wound metal hose or affect the thermal impact on this surface during heat exposure and quenching. Oil is particularly preferred as the coating. Preferably, the coating is removed through heat exposure or quenching.

It may turn out to be useful when said heat exposure in step b) comprises exposing said wound metal hose to heat at a temperature T1 of more than 950° C., preferably of at least 1000° C., preferred of at least 1050° C., for a time t1 of in the range from 10 to 200 seconds, preferably in the range from 50 to 100 seconds, preferred in the range from 70 to 90 seconds. The temperature T1 may reach 1200° C. or higher, depending on the material, shape and dimension of the wound metal hose. Preferably, the wound metal hose is heated up to the temperature T1 throughout its wall thickness.

It may prove advantageous when said quenching in step b) comprises applying a quenching medium to the wound metal hose at a temperature T2 in the range from 40 to 120° C., preferably of in the range from 60 to 100° C., preferred in the range from 75 to 85° C., for a time t2 in the range from 1 to 50 seconds, preferably in the range from 5 to 20 seconds, preferred in the range from 10 to 15 seconds. The quenching medium is preferably a fluid, preferred a liquid or gas, and most preferred water or oil.

A preferred embodiment of the invention includes adapting the conditions of heat exposure and/or quenching in step b) to the dimensions and/or the material of the wound metal hose, so that the thermal stiffening rate is less than +/−50%, preferably less than +/−25%, preferred less than +/−15%. The thermal stiffening rate indicates the increment of friction of the wound metal hose after a thermal impact, e.g. under operating conditions of a motor vehicle, compared to its original state. Contemporary gasoline or diesel engines operate in an exhaust gas temperature range of about 750 to 950° C. A thermal stiffening rate of +50% indicates that, when said wound metal hose undergoes a thermal impact in the range of about 750° C. to 950° C. (corresponding to regular operating temperature conditions of contemporary gasoline or diesel engines) subsequent to the quenching, the friction after said thermal impact has increased by 50%, when measured under identical conditions before and after said thermal impact.

The ageing effect may also be expressed in terms of a dynamic stiffness rate, which indicates the increment of dynamic stiffness of the wound metal hose under operating conditions compared to its original state. The dynamic stiffness corresponds to the ratio between friction force and deformation, when the wound metal hose is excited to oscillate between contracted and expanded conditions, wherein the dynamic stiffness varies with the frequency of excitation. Dynamic stiffness can be measured for different kinds of deformation, e.g. deformation in axial and/or lateral directions by expansion and contraction, or deformations by bending or torsion. Contemporary gasoline or diesel engines operate at an engine revolution speed of up to about 9000 rpm, resulting in an excitation frequency of about 150 Hz (9000/60=150). Preferably, the conditions of heat exposure and/or quenching in step b) are adapted to the dimensions and/or the material of the wound metal hose, so that the dynamic stiffness rate measured for deformation in axial and/or lateral direction, in bending and/or torsion is less than +100%, preferably less than +75%, preferred less than +50% in a frequency range of 0 to 300 Hz, preferably in a frequency range of 0 to 200 Hz, preferred in a frequency range of 0 to 120 Hz. A dynamic stiffness rate of +100% indicates that, when said wound metal hose undergoes a thermal impact in the range of 750° C. to 950° C. (corresponding to regular operating temperature conditions of contemporary gasoline or diesel engines) subsequent to the quenching, the dynamic stiffness for deformation in axial and/or lateral directions, in bending and/or torsion after said thermal impact has increased by 100% compared to the state before said thermal impact at the same frequency of excitation within a frequency range of 0 to 300 Hz, preferably in a frequency range of 0 to 200 Hz, preferred in a frequency range of 0 to 120 Hz, when measured under identical conditions before and after said thermal impact.

It may turn out to be useful when said heat exposure in step b) includes heating said wound metal hose by induction. The wound metal hose can be induction-heated to the temperature required for heat exposure in rather short time, which proves advantageous in terms of procedural aspects.

If may be helpful when said heat exposure and/or said quenching in step b) is conducted in ambient atmosphere or in exhaust gas containing atmosphere.

BRIEF DESCRIPTION OF THE DRAWINGS

FIG. 4 are schematic drawings illustrating the relation between friction force and friction energy, wherein FIG. 4a schematically represents a jig for measuring friction force and axial displacement of a flexible piping device; wherein FIG. 4b shows a hysteresis curve representing the correlation of force and axial displacement obtained from the flexible piping device shown in FIG. 4a.

FIG. 5 shows the effects of the invention on interlock friction of a decoupling element comprising a wound metal hose over the lifetime/mileage of a vehicle furnished with such decoupling element, wherein FIG. 5a shows a friction vs. mileage diagram of a decoupling element comprising a conventional wound metal hose without pre-conditioning treatment, whereas

FIG. 6 shows the effects of the invention on dynamic stiffness behaviour over usage/ageing and the frequency of excitation, wherein FIG. 6a shows a dynamic stiffness vs. frequency diagram of a decoupling element comprising a conventional wound metal hose without pre-conditioning treatment, whereas FIG. 6b shows the dynamic stiffness vs. frequency diagram of a decoupling element comprising the wound metal hose produced by the method according to the invention.

FIG. 7 shows the effects of the method according to the invention on dynamic stiffness behaviour over usage/ageing and the frequency of excitation based on the results given in FIG. 6, wherein the results are given in relation to the initial dynamic stiffness (mileage of 0 km).

DETAILED DESCRIPTION OF THE PREFERRED EMBODIMENTS

The present invention will now be described with reference to the accompanying Figures.

The present invention discloses a method for manufacturing a flexible piping device for an exhaust gas system of a motor vehicle, said method comprising the steps:
  a) forming a wound metal hose 1 from at least one profiled metal strip 2, so that strip edges of adjacent strip windings 3 movably interlock;
  b) exposing said wound metal hose 1 to heat and subjecting said wound metal hose 1 to quenching; and
  c) assembling the flexible piping device from said wound metal hose 1 and from other components.

Figure 1:
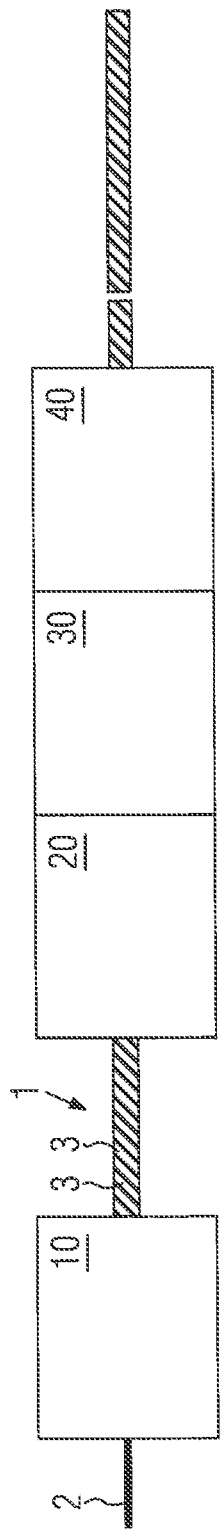
FIG. 1 is a schematic representation of the method according to the invention.
Figure 2:
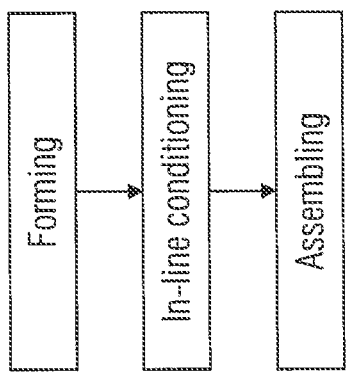
FIG. 2 is a flow diagram of the method according to the invention.

FIG. 1 is a schematic representation of the method according to the invention and an apparatus for carrying out said method, and FIG. 2 is a flow diagram of the method according to the invention.

The apparatus depicted in FIG. 1 comprises a forming unit 10, a heat exposure unit 20, a quenching unit 30 and a cutting unit 40.

Step a), which is conducted in the forming unit 10, comprises forming said metal strip 2 into an S-profile and winding said S-profiled metal strip 2 in the shape of a thread, such that strip edges of adjacent strip windings 3 movably interlock and engage into one another, respectively.

Figure 3:
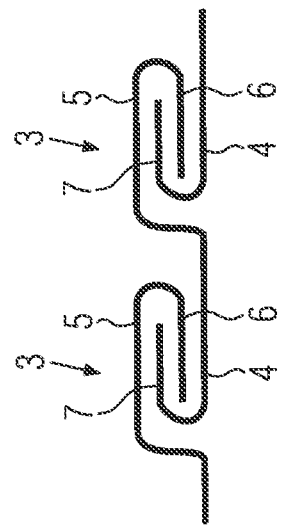
FIG. 3 is a schematic representation of movably interlocked strip windings of a wound metal hose as seen in a cross-section of the wound metal hose along its axis.

FIG. 3 is a schematic representation of interlocked strip windings 3 of a wound metal hose 1 resulting from step a) as seen in a cross-section of the hose 1 along its axis. The adjacent strip windings 3 movably interlock so that legs 4, 5, 6, 7 thereof overlap in a radial direction of the hose 1. At least some of the legs 4 to 7 may enter into sliding contact, wherein the contact force and the coefficient of friction on the contacting or sliding surfaces determine the friction between them. A coating, preferably a lubricant coating such as oil, may be applied to the metal strip 2 or the wound metal hose 1 in step a). Preferably, the wound metal hose 1 is provided in the form of a continuous strand.

In step b), which is conducted in the heat exposure unit 20 and the quenching unit 30, respectively, said wound metal hose 1 is first exposed to heat at a temperature T1 of 1045° C. to 1200° C. for a time t1 of in the range from 70 to 90 seconds, and afterward subjected to quenching at a temperature T2 in the range from 75 to 85° C. for a time t2 in the range from 10 to 15 seconds. Heat may be applied to the wound metal hose 1 by induction under ambient conditions in terms of atmosphere and pressure. For quenching, a liquid quenching medium such as water may be applied to the wound metal hose 1 in the form of a spray or by sprinkling. The optimum conditions of heat exposure and/or quenching in step b), i.e. the optimum values for T1, t1, T2, t2, may vary with the dimensions and/or the material of the wound metal hose 1, and are preferably chosen in such a way that the thermal stiffening rate is not more than +/−50% and a dynamic stiffness rate is not more than +100%. The optimum conditions of heat exposure and/or quenching can be found out by testing.

The wound metal hose 1 may be tailored/cut to its final length prior to, during or after step b). The tailoring/cutting is performed in a cutting unit 40.

Step c) covers the assembling of the flexible piping device from said wound metal hose 1 and from other components. The other components may include at least one plastic layer, e.g. a line, a coating or a bellows member, and/or at least one textile reinforcement layer to be fitted onto or into the wound metal hose as an outer or inner layer.

Figure 4A:
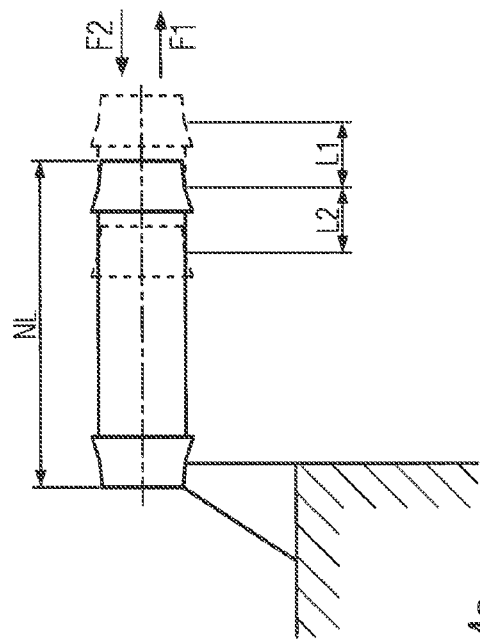
Figure 4B:
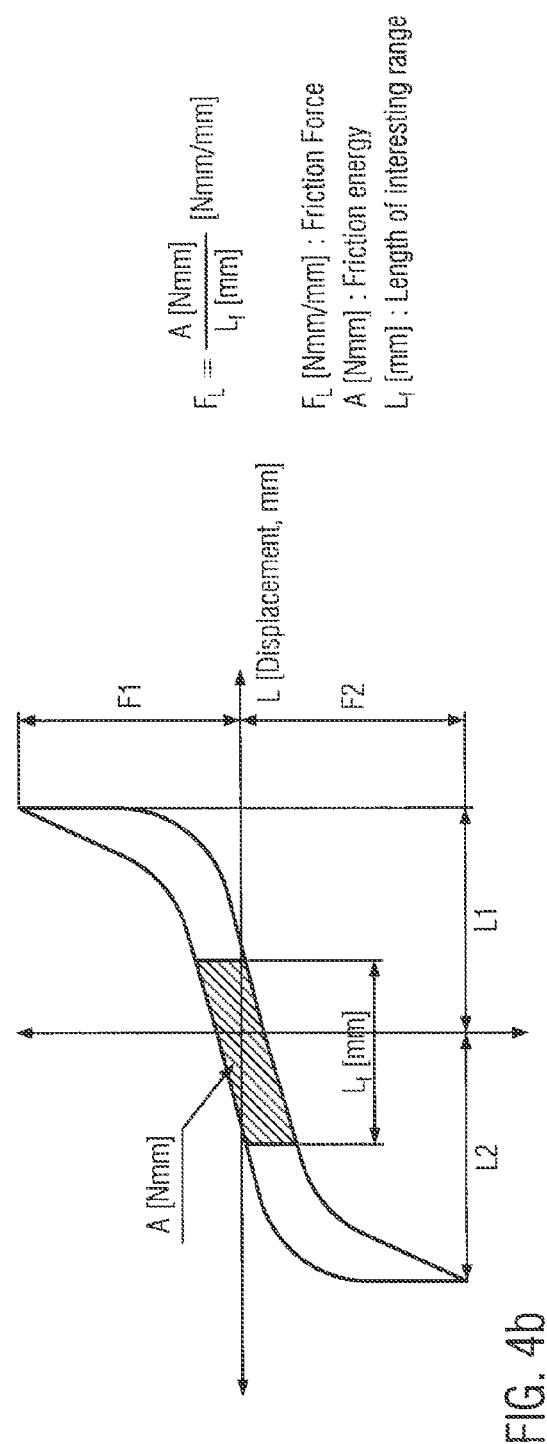

FIG. 4 are schematic drawings illustrating the relation of friction force and friction energy. FIG. 4a schematically represents a jig for measuring friction force and axial displacement of a flexible piping device. NL indicates the neutral length of the flexible piping device, whereas L1 corresponds to the expanded length and L2 corresponds to the contracted length of the flexible piping device. F1 corresponds to the force applied to expand the flexible piping device from NL to L1 and F2 corresponds to the force applied to contract the flexible piping device from NL to L2. FIG. 4b shows a hysteresis curve representing the correlation of force and axial displacement measured for the flexible piping device shown in FIG. 4a.

For measuring the interlock friction, the flexible piping device is transferred between a contracted state and an expanded state, so that the force-displacement-relation can be determined and transferred to a force-displacement diagram, resulting in the technical hysteresis curve, as depicted in FIG. 4b. The friction force F is the ratio of the area A within that hysteresis curve representing the friction energy and the width of the hysteresis curve representing the displacement L. In other words, the work force is the average distance of the upper and lower lines defining the hysteresis curve in force-displacement diagram. The friction force F is indicative of the axial static stiffness of the flexible piping device. For measuring the dynamic stiffness in axial expansion and contraction, the flexible piping device is excited to oscillate with a given frequency between the contracted state and the expanded state, as depicted in FIG. 4b. The dynamic stiffness is the ratio between friction force F and displacement L.

Figure 5B:
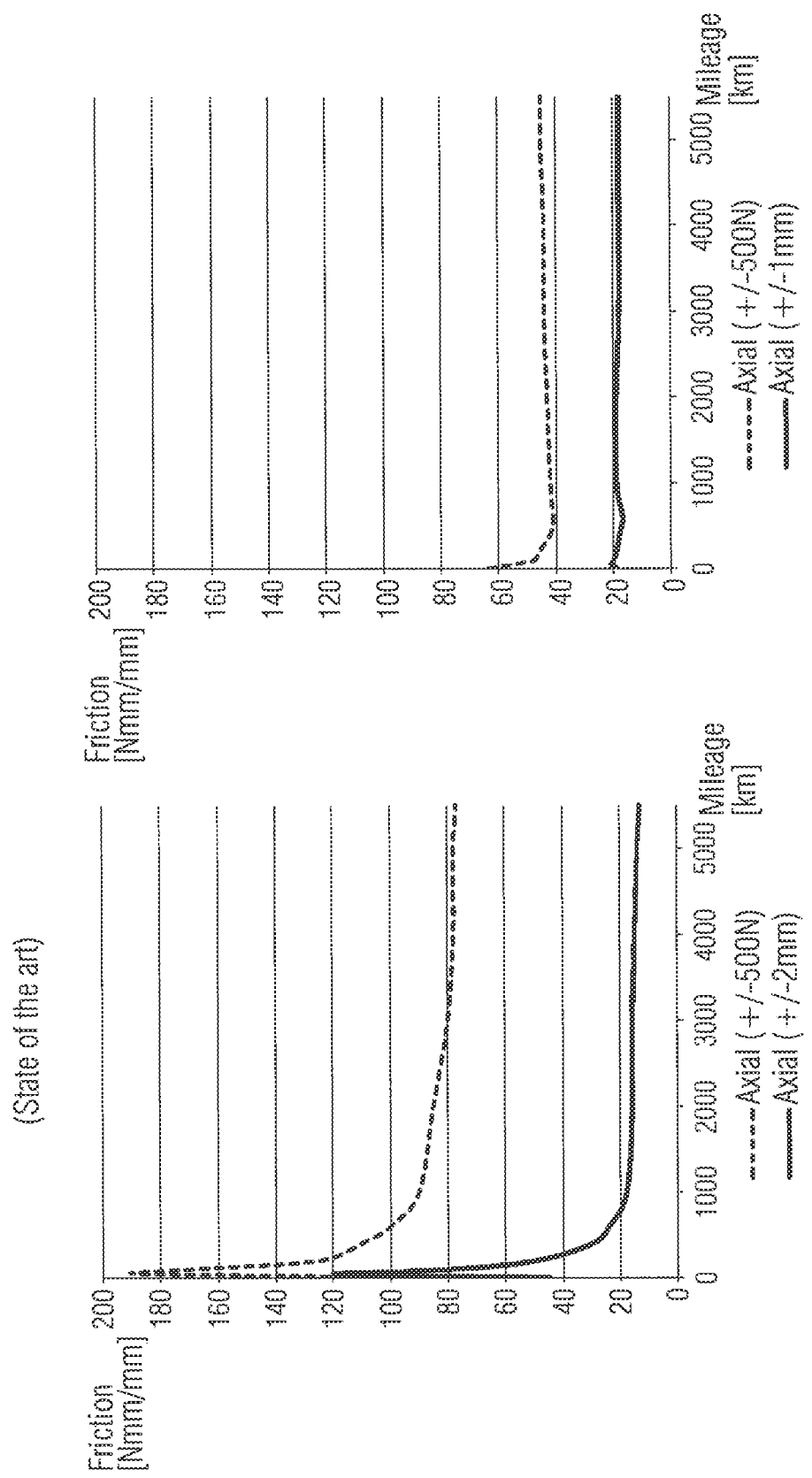
FIG. 5b shows a friction vs. mileage diagram of a decoupling element comprising the wound metal hose produced by the method according to the invention.

FIG. 5 shows the effects of the invention on friction of a decoupling element comprising a wound metal hose over the lifetime/mileage of a vehicle furnished with such decoupling element. The friction can be measured as described in context with FIG. 4. FIG. 5a shows a friction vs. mileage diagram of a flexible piping device embodied as a decoupling element and comprising a conventional wound metal hose without pre-conditioning treatment, whereas FIG. 5b shows a friction vs. mileage diagram of a flexible piping device embodied as a decoupling element and comprising the wound metal hose produced by the method according to the invention. Identical measuring conditions applied for the conventional device and the inventive device, so that the results obtained are directly comparable and immediately show the effects of the invention. As can be inferred from FIG. 5a, the conventional decoupling element reveals a thermal stiffening rate of more than +200%, as the initial friction value increases from about 45 Nmm/mm to an initial peak of about 120 Nmm/mm before decreasing down to a level of about 20 Nmm/mm, measured for an axial displacement of +/−2 mm (corresponding to L1 and L2 in FIG. 4). For an axial load of +/−500 N (corresponding to F1 and F2 in FIG. 4), the initial friction value increases from about 120 Nmm/mm to an initial peak of about 190 Nmm/mm before decreasing to a level of about 80 Nmm/mm. On the other hand, as can be inferred from FIG. 5b, the decoupling element produced according to the invention reveals an initial and long-term friction value of 20 Nmm/mm, measured for an axial displacement of +/−1 mm (corresponding to L1 and L2 in FIG. 4). For an axial load of +/−500 N (corresponding to F1 and F2 in FIG. 4), the initial friction value decreases from about 60 Nmm/mm to about 40 Nmm/mm, resulting in a thermal stiffening rate of about −33%.

FIG. 6 shows the effects of the invention on dynamic stiffness behaviour over usage/ageing and the frequency of excitation. The dynamic stiffness varies to a great extent with the frequency of excitation, i.e. the number of cycles per time in axial or lateral expansions/contractions, torsion or bending. FIG. 6a shows a dynamic stiffness vs. frequency diagram of a decoupling element comprising a conventional wound metal hose without pre-conditioning treatment, whereas FIG. 6b shows the dynamic stiffness vs. frequency diagram of a decoupling element comprising the wound metal hose produced by the method according to the invention. Again, identical measuring conditions applied for the conventional device and the inventive device, so that the results obtained are directly comparable and immediately show the effects of the invention. As can be inferred from FIG. 6a, the conventional decoupling element reveals an extremely versatile dynamic stiffness behaviour in the frequency range from 0 to 300 Hz with significant peaks at about 100, 200 and 270 Hz. Most notably, the curves representing a mileage of 50, 1000 and 2000 km are on considerably higher and lower levels, respectively, compared to the curve representing a mileage of 0 km, indicating considerable variations as compared to the initial dynamic stiffness. For example, the dynamic stiffness value can reach up to 900 N/mm for a mileage of 50 km at 200 Hz. On the other hand, as can be inferred from FIG. 6b, the dynamic stiffness values of the decoupling element produced according to the invention are almost identical for mileages of 0, 50, 1000 and 5000 km, wherein the peak of 200 N/mm occurs only at frequencies of more than 200 Hz. However, in the common operating frequency range from 0 to 150 Hz, which results from the rotational speed range of gasoline or diesel engines of less than 9000 rpm (equivalent to 150 Hz), the dynamic stiffness value mostly remains below 100 N/mm and exceeds 100 N/mm only at about 120 Hz. Hence, a significant reduction of ageing effects can be obtained with the decoupling element made in accordance with the invention.

FIG. 7 shows the effects of the method according to the invention on dynamic stiffness behaviour over usage/ageing and the frequency of excitation based on the results given in FIG. 6, wherein the results are given in relation to the initial dynamic stiffness (mileage of 0 km). Hence, FIG. 7 directly indicates the dynamic stiffness rates. Identical measuring conditions applied for the conventional device and the inventive device, so that the results obtained are directly comparable and immediately show the effects of the invention. As can be seen from FIG. 7a, the dynamic stiffness rate of the conventional decoupling element varies between +300% (mileage of 50 km) and −300% (mileage of 1000 or 5000 km) with significant peaks at about 100, 200 and 270 Hz. On the other hand, as can be inferred from FIG. 7b, the dynamic stiffness rate of the decoupling element according to the invention varies between +20% (at 100 Hz) and −70% (at 220 Hz).

As has been shown by comparison with the state of the art, the method according to the invention considerably reduces NVH effects of flexible piping devices comprising wound metal hoses with movably interlocked adjacent strip windings due to a significant reduction of friction and a significant reduction of residual stress on the contacting surfaces.

The invention claimed is:

1. A method for manufacturing a flexible piping device for an exhaust gas system of a motor vehicle, said method comprising the steps of:
   a) forming a wound metal hose from at least one profiled metal strip so that strip edges of adjacent strip windings movably interlock;
   b) exposing said wound metal hose to heat treatment and subjecting the heat-treated wound metal hose to quenching; and
   c) assembling the flexible piping device from said wound metal hose and one or more other components.

2. The method according to claim 1, wherein step a) comprises forming a continuous strand of wound metal hose.

3. The method according to claim 1, further comprising continuously feeding said wound metal hose from step a) to step b) and/or from step b) to step c).

4. The method according to claim 1, wherein step a) comprises profiling said metal strip in the shape of a thread, such that strip edges of adjacent strip windings movably engage into one another.

5. The method according to claim 1, wherein said wound metal hose subjected to step b) comprises a coating.

6. The method according to claim 1, wherein step b) comprises exposing said wound metal hose to heat at a temperature T1 of more than 950° C., for a time t1 of in the range from 10 to 200 seconds.

7. The method according to claim 1, wherein step b) comprises applying a quenching medium to the wound metal hose at a temperature T2 in the range of 40 to 120° C., for a time t2 in the range from 1 to 50 seconds.

8. The method according to claim 1, further comprising adapting the conditions of heat treatment and/or quenching in step b) to the dimensions and/or the material of the wound metal hose, so that a thermal stiffening rate is less than +/−50%.

9. The method according to claim 1, further comprising adjusting the conditions of heat treatment and/or quenching in step b) in accordance with the dimensions and/or material of the wound metal hose, so that a dynamic stiffness rate measured for deformation in axial and/or lateral directions, in bending and/or torsion is less than +100%, in a frequency range of 0 to 300 Hz.

10. The method according to claim 1, wherein step b) includes heating said wound metal hose by induction.

11. The method according to claim 1, wherein step b) comprises conducting said exposing the wound metal hose to heat treatment and subjecting the heat-treated wound metal hose to quenching in oxygen-containing atmosphere or exhaust gas containing atmosphere.

12. The method according to claim 2, wherein step b) comprises subjecting said continuous strand to in-line conditioning including in-line heat treatment and/or in-line quenching.

13. The method according to claim 5, wherein the coating is a liquid coating.

14. The method according to claim 5, wherein the coating is a lubricant coating.

15. The method according to claim 5, wherein the coating is lubricant residues remaining from step a).

16. The method according to claim 6, wherein the temperature T1 is at least 1000° C.

17. The method according to claim 6, wherein the temperature T1 is at least 1050° C.

18. The method according to claim 6, wherein the time t1 is in the range from 50 to 100 seconds.

19. The method according to claim 6, wherein the time t1 is in the range from 70 to 90 seconds.

20. The method according to claim 7, wherein the temperature T2 is in the range of 40 to 120° C.

21. The method according to claim 7, wherein the temperature T2 is in the range from 60 to 100° C.

22. The method according to claim 7, wherein the temperature T2 is in the range from 75 to 85° C.

23. The method according to claim 7, wherein the time t2 is in the range from 5 to 20 seconds.

24. The method according to claim 7, wherein the time t2 is in the range from 10 to 15 seconds.

25. The method according to claim 8, wherein the thermal stiffening rate is less than 25%.

26. The method according to claim 8, wherein the thermal stiffening rate is less than 15%.

27. The method according to claim 9, wherein the dynamic stiffness rate is less than +75%.

28. The method according to claim 9, wherein the dynamic stiffness rate is less than +50%.

29. The method according to claim 9, wherein the dynamic stiffness rate is measured in a frequency range from 0 to 200 Hz.

30. The method according to claim 9, wherein the dynamic stiffness rate is measured in a frequency range of 0 to 120 Hz.

31. A method for manufacturing a flexible wound metal hose for an exhaust gas system of a motor vehicle, said method comprising:

winding at least one profiled metal strip into a flexible wound metal hose having strip edges of adjacent strip windings formed to interlock and move relative to one another;

exposing the flexible wound metal hose to heat treatment; and quenching the heat-treated flexible wound metal hose.

32. The method according to claim 31, wherein the adjacent strip windings of the flexible wound metal hose are formed in an Agraff-type configuration.

33. The method according to claim 31, wherein said quenching the heat-treated flexible wound metal hose comprises exposing the heat-treated flexible wound metal hose to a quenching medium at a temperature and for a time sufficient to quench at least contacting surfaces of the strip edges of adjacent strip windings of the flexible wound metal hose.

34. The method according to claim 31, further comprising providing at least the contact surfaces of the profiled metal strip with a coating prior to said exposing the flexible wound metal hose to heat treatment, the coating being selected from one of a lubricant coating and lubricant residues resulting from said winding at least one profiled metal strip.

35. The method according to claim 34, wherein the coating is oil.

* * * * *